United States Patent [19]

Winzer et al.

[11] Patent Number: 4,564,755

[45] Date of Patent: Jan. 14, 1986

[54] TRANSMISSION AND RECEPTION DEVICE FOR A FIBER-OPTICAL SENSOR SYSTEM

[75] Inventors: Gerhard Winzer, Putzbrunn; Hans Mahlein, Unterhaching, both of Fed. Rep. of Germany

[73] Assignee: Siemens Aktiengesellschaft, Berlin & Munich, Fed. Rep. of Germany

[21] Appl. No.: 509,993

[22] Filed: Jun. 30, 1983

[30] Foreign Application Priority Data

Aug. 17, 1982 [DE] Fed. Rep. of Germany ....... 3230570

[51] Int. Cl.$^4$ ............................................... G01D 5/34
[52] U.S. Cl. .................. 250/227; 250/231 R; 350/96.15
[58] Field of Search ............... 350/96.15, 96.16, 96.20; 250/227, 231 R; 455/617, 612, 610, 613, 602, 605, 606; 73/655

[56] References Cited

U.S. PATENT DOCUMENTS

| | | | |
|---|---|---|---|
| 4,244,045 | 1/1981 | Nosu et al. | 455/612 |
| 4,317,699 | 3/1982 | Winzer et al. | 350/96.15 |
| 4,341,438 | 7/1982 | Seki et al. | 455/612 |
| 4,356,396 | 10/1982 | Ruell et al. | 250/227 |
| 4,498,731 | 2/1985 | Winzer et al. | 350/96.16 |

FOREIGN PATENT DOCUMENTS

EP37007 10/1981 Fed. Rep. of Germany ... 350/96.15

*Primary Examiner*—Davis L. Willis
*Assistant Examiner*—J. Jon Brophy
*Attorney, Agent, or Firm*—Hill, Van Santen, Steadman & Simpson

[57] ABSTRACT

A transmission and reception device for a fiber-optical sensor system functioning with two wavelengths is disclosed wherein light of a first wavelength and light of a second wavelength are supplied over in-coupling fibers of a fiber-optical brancher to a fiber path of the sensor system and wherein light returning over the fiber path is supplied over an out-coupling fiber of the brancher to an evaluation means. The brancher is designed such that the greatest part of the returning light is coupled out over the out-coupling fiber. Two advantageous embodiments of such a brancher are disclosed, the one being designed in the form of a non-frequency-selective, asymmetrical quad-gate brancher and the other being designed in the form of a frequency-selective, five-gate brancher.

19 Claims, 10 Drawing Figures

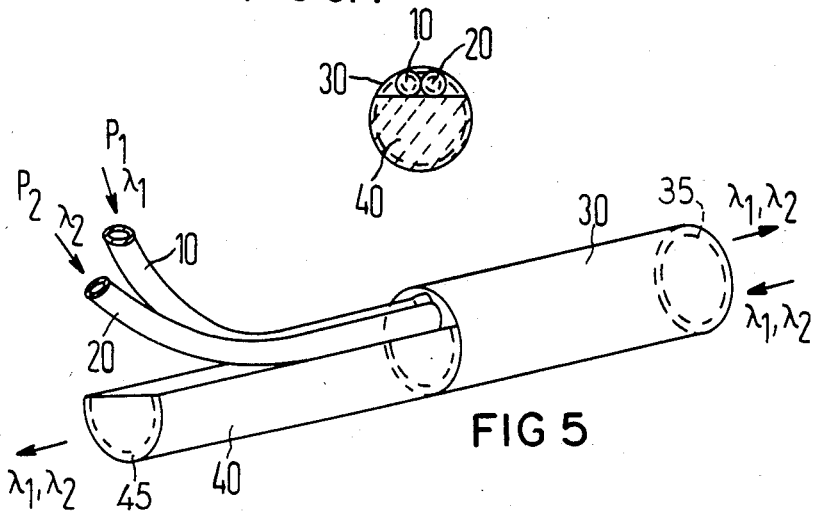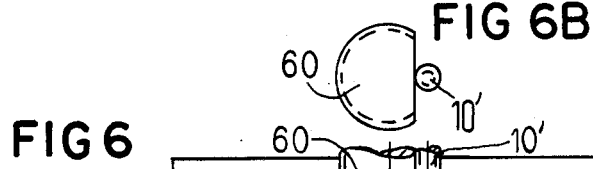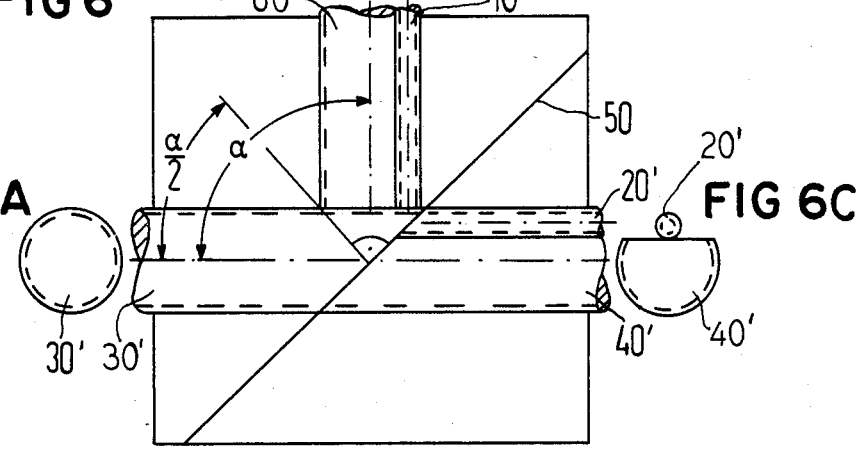

TRANSMISSION AND RECEPTION DEVICE FOR A FIBER-OPTICAL SENSOR SYSTEM

BACKGROUND OF THE INVENTION

1. Field of the Invention

The present invention relates to a transmission and reception device for a fiber-optical sensor system functioning with two wavelengths and to a fiber-optical brancher useful with such a system.

2. Description of the Prior Art

A fiber-optical sensor system with a transmission and reception device of the this type is known from the EP No. 00 54 292. In that this transmission and reception device, a transmitter in the form of a light source emits light with a first wavelength and, at the same time, light with a second wavelength. The emitted light is supplied to the transmitter-side end of the fiber path of the sensor system in essentially free beam propagation by means of two-semi-reflecting mirrors. The light with the first wavelength emerging from the transmitter side end and the light with the second wavelength likewise emerging from the transmitter side end are supplied to the allocated evaluation means, being likewise supplied in essentially free beam propagation over the beam-splitting mirrors and, if need be, over narrow band filters.

The two beam splitter mirrors mean a relatively high loss which, given the manner of functioning of the known sensor system, amounts to 9 dB for the light with the second wavelengh employed as measuring light and amounts to 12 dB for the light with the first wavelength employed as reference light.

Because of the essentially free beam propagation, lenses for beam-shaping and effective in-coupling of light into the fiber path are required, given the known transmission and reception devices so that the optical part of the transmission and reception devices having these lenses and the various mirror and filter laminae is complicated in terms of structure and requires considerable manufacturing outlay.

SUMMARY OF THE INVENTION

It is an object of the present invention to provide a transmission and reception device of the type described above which is constructed and manufacturable in a relatively simple manner and which has minimal transmission losses.

This object is achieved by means of utilizing a fiber-optical light waveguide brancher which includes one gate at the side of the fiber path to which the fiber path is coupled and one respective gate per transmitter at the side facing away from the fiber path to which an allocated transmitter is coupled, and also includes a gate allocated to the evaluation means to which the evaluation means is connected.

This solution has the advantage that all optical components in the transmission and reception device exploit light conduction in light waveguides, particularly in glass fibers. Areas with free beam propagation no longer exist. Consequently, the optical part of the inventive transmission and reception device can be made very small and compact with the technology of micro-optics.

A first expedient embodiment of an inventive transmission and reception device includes two separate detectors of which one is sensitive to the first wavelength and the other is sensitive to the second wavelength; and in that a light waveguide demultiplexer is disposed between the gate of the brancher allocated to the evaluation means and the detectors. The wavelength demultiplexers contained in this embodiment can, for example, be a module as extensively described in App. Opt. 20 (1981), pp. 3128–3135 or can be a similar module. In the fiber path, for example, it contains only one dielectrical cut-off filter.

When particularly high demands are made of the measuring precision, it is expedient to develop the first embodiment by including a narrow band filter disposed between the wavelength demultiplexer and the detector, the filter essentially allowing only the detected wavelength to pass. A modification of the wavelength demultiplexer module can be employed therefor, including additional narrow band filters in addition to the cut-off filter.

A particularly advantageous development of the first embodiment comprises the brancher and wavelength demultiplexer designed as a single, five-gate, wavelength-selective light waveguide brancher which can thereby be constructed as a single, compact module.

A second expedient embodiment of an inventive transmission and reception device is disclosed in which the evaluation means comprises two diodes monolithically integrated above one another in a single semiconductor module, of which the upper diode coupled to the gate of the brancher allocated to the evaluation means is only sensitive to one of the two wavelengths and is transparent for the other wavelength. The necessary separation of the light having different wavelengths is executed given this embodiment in the diode arrangement with diodes integrated above one another. Such diode arrangements are described, for instance, in Proc. Europ. Conf. Optical Commun., Munich, 1977, pp. 173–175 and Jpn. J. Appl. Phys. 19, Supp. 19-2 (1980), pp 213–216.

A third embodiment of an inventive transmission and reception device provides that the evaluation means consists of a spectrometer or a means analyzing the chronological progression of the supplied signals, which is connected to the gate of the fiber-optical brancher allocated to the evaluation means.

Particularly given employment of this third embodiment in a sensor system as described in EP No. 00 54 292, it is expedient to utilize a single transmitter which emits both wavelengths such as a light-emitting diode having a large emission half-value width. By so doing, a particularly simple structure is made possible and different behavior of the fiber path for light of different wavelengths can be prevented from having an effect. A compensation with the assistance of the reference light as calibration reference is nearly ideal. Moreover, all components of the spectrum of the light-emitting diode lie in a relatively narrow spectral range.

Let it be pointed out that the employment of different components of a light-emitting diode spectrum for message communication is already disclosed in Trans. IECE Japan E63 (1980), pp. 770–771 and in Proc. Europ. Conf. Optical Commun., Copenhagen (1981) 17.4-1 through 17.4.4.

Apart from the simple measuring principle provided with the third embodiment and its development, the optical insertion losses which occur are also very low.

An advantageous brancher, particularly suitable for an inventive transmission and reception device, is provided comprising two butt-coupled thick fibers of which one is laterally ground, and one or more thin fibers applied to the laterally ground face of the one thick fiber, the thin fibers being likewise butt-coupled to the unground thick fiber. Let it be pointed out that this new, fiber-optical brancher is not restricted to employment in a transmission and reception device but can also be advantageously employed elsewhere.

However, the fiber-optical brancher disclosed is expediently disposed in the inventive transmission and reception device as also disclosed.

An advantageous, five-gate, wavelength-selective brancher which is particularly suitable for the inventive transmission and reception device is provided wherein two thick aligned fibers are separted by a frequency-selective filter layer disposed obliquely relative to their axes; wherein a branching, thick fiber is disposed such that a radiation coupled out of one of the two aligned fibers and reflected at the filter layer is coupled into the branching fiber. Also, the other aligned fiber and the branching fiber are laterally ground such that thinner fibers may be axially aligned with the ground fibers facing the filter layer such that radiation can transfer between each of the thinner fibers and the unground thick fiber through the filter layer or due to reflection thereat.

This brancher is likewise not restricted to employment in transmission and reception devices but can also be employed elsewhere.

This five-gate brancher is also expediently disposed in the disclosed inventive transmission and reception device.

The inventive branchers are all asymmetrical branchers, i.e., they employ mutually different fibers, particularly having different diameters. They are characterized by simple structure, simple manufacturing feasabilities and low insertion losses.

BRIEF DESCRIPTION OF THE DRAWINGS

The invention is described in greater detail by way of example below with reference to the attached drawings. Shown in drawings are:

FIG. 5 is a perspective view of an inventive branching with four gates as can be employed in the embodiments according to FIGS. 1 through 4.

FIG. 5A is a view of a cross-section through the ground thick core fiber and the attached thinner fibers in the proximity of the unground thick core fiber taken generally along the lines V—V of FIG. V.

FIG. 6 is a side view of an inventive, five-gate wavelength-selective brancher.

FIG. 6A is a plan view of an end of a fiber taken generally along the lines A—A of FIG. 6.

FIG. 6B is a plan view of an end of a fiber taken generally along the lines B—B of FIG. 6.

FIG. 6C is a plan view of an end of a fiber taken generally along the line C—C of FIG. 6.

DESCRIPTION OF THE PREFERRED EMBODIMENTS

Figure 1:
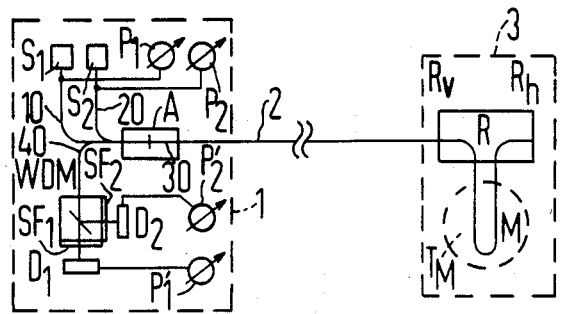
FIG. 1 is a schematic illustration of a sensor system with a first embodiment of an inventive transmission and reception device.

In the sensor sytems according to FIGS. 1 through 4, the transmission and reception devices are respectively referenced 1, the fiber path 2 and the sensor 3. The sensor 3 comprises a sensor cell R with an in-coupling mirror $R_v$ by means of which the reference light is separated from the measuring light in a known manner, i.e., the reference light returns to the transmission and reception device 1 over the fiber path 2 whereas the measuring light traverses a measuring zone M, strikes a backcoupling mirror $R_h$ and returns from there through the measuring zone M and the fiber path 2 to the transmission and reception means 1. In the measuring zone M, the measuring light traverses a medium whose transmission $T_M$ depends on a measurable variable x. The light proceeding back to the transmission and reception device is attenuated by a factor $T_M^2$ because the measuring zone M is traversed twice.

The sensor 3 shall not be discussed in greater detail. However, reference may be made to the EP No. 00 54 292 in this context.

Figure 3:
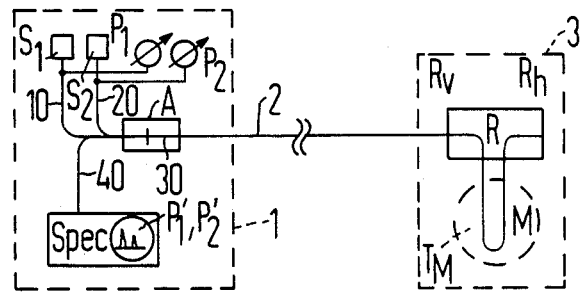
FIG. 3 is a schematic illustration of a sensor system with a third embodiment of an inventive transmission and reception device.

The transmission and reception device 1 in the embodiments according to FIGS. 1 and 3 exhibits two light sources S1 and S2 of which, for example, the light source $S_1$ emits the reference light with a first wavelength $\lambda_1$ and the light source $S_2$ emit the measuring light with a second wavelength $\lambda_2$. The light powers $P_1$ and $P_2$ respectively emitted by the light source $S_1$ and $S_2$ are expediently monitored by measuring devices.

The measuring light and the reference light are supplied over a fiber 20 and a fiber 10 respectively to a fiber-optical brancher A in which the measuring light and the reference light are combined in a fiber 30 to which the fiber path 2 is connected. The fiber 30 and the fiber path 2 can consist of a single fiber.

The fiber-optical brancher A is constructed such that the component of the reference light and of the measuring light returning to the transmission and reception device 1 through the fiber path 2 is, for its major part, coupled into a fiber 40 connected to the fiber 30 and only a lesser part is coupled into the fibers 10 and 20 leading to the light sources.

Connected to the fiber 40 is an evaluation means in which the power $P_1$, of the part of the reference light returning to the transmission and reception device 1 and the power $P_2$, of the part of the measuring light likewise returning can be measured.

In the embodiment according to FIG. 1, the evaluation means exhibits two separate detectors $D_1$ and $D_2$ of which the detector $D_1$ is sensitive to the wavelength $\lambda_1$ of the reference light and the detector $D_2$ is sensitive to the wavelength $\lambda_2$ of the measuring light. Situated between the detectors and the fiber 40 is a fiber-optical wavelength demultiplexer WDM which separates the measuring light from the reference light so that it is essentially only the reference light which is supplied to the detector $D_1$ and it is essentially only the measuring light which is supplied to the detector $D_2$. An employable wavelength demultiplexer WDM has already been specified above.

A narrow band filter $SF_1$ or, respectively, $SF_2$ which essentially allows only the wavelength of the reference light or, respectively, of the measuring light to pass is disposed between the wavelength demultiplexer WDM and the detector $D_1$ or, respectively, $D_2$ in order to increase the measuring precision.

Figure 2:
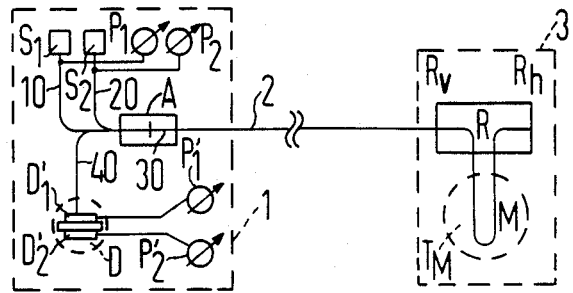
FIG. 2 is a schematic illustration of a sensor system with a second embodiment of an inventive transmission and reception device.

In the embodiment according to FIG. 2, the evaluation means D consists of two diodes $D_1$, and $D_2$, monolithically integrated above one another in a single semiconductor module. The upper diode $D_1$, is transparent for the light having the shorter of the two wavelengths $\lambda_1$, $\lambda_2$ and is sensitive only for the light having the longer wavelength. The necessary separation of the light having the different wavelengths $\lambda_1$, $\lambda_2$ is thus carried out in the diode arrangement D. As already mentioned, these diode arrangements are known.

In the embodiment according to FIG. 3, the evaluation means consists of a spectrometer Spec.

Figure 4:
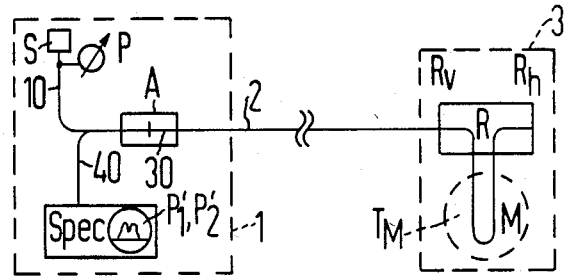
FIG. 4 is a schematic illustration of a sensor sytem with a modified third embodiment of an inventive transmission and reception device.

The embodiment according to FIG. 4 differs from the embodiment according to FIG. 3 only in that a single light source S is employed for generating the measuring light and the reference light, said single light source S emitting both wavelengths $\lambda_1$ and $\lambda_2$. This light is supplied over the fiber 10 to the brancher A which, in comparison to the brancher A according to FIG. 3, exhibits no fiber 20 because this is superfluous.

A light-emitting diode having a high emission half-width is preferably employed as the light source S. The reflector $R_v$ of the sensor 3 is designed to match the spectral distribution of the emission. For example, $R_v$ is transparent narrow-band in the range of the emission maximum of the transmission diode S but is otherwise highly reflective. This light component of the emission, thus, severs to measure the variable x. The mirror $R_h$ reflects at least in the central range of the emission. Given observation of the light returning to the transmission and reception station 1 with the spectrometer Spec, a peak-to-valley ratio dependent on x can be identified in the center of the spectrum. The measurable variable x can be determined therefrom.

It is also possible to employ a cut-off filter instead of the narrow band filter for $R_v$ such that, for example, the left half of the emission spectrum is allocated to the reference light and the right half is allocated to the signal from the sensor cell R.

The advantage of the transmission and reception device 1 according to FIG. 4 consists not only of its simplicity. All components of the light-emitting diode spectrum lie in a relatively narrow spectral range. Different behavior of the fiber path for light having different wavelengths therefore has no effect here. The compensation with the assistance of the reference light is nearly ideal.

Given the embodiment according to FIG. 3 having the non-wavelength-selective brancher A, it is also possible to operate the light sources $S_1$ and $S_2$ which emit different wavelengths pulsed with a chronological spacing. A spectrometer is then not required at all for the evaluation and the chronological curve of the returning signals need merely be analyzed, namely, with a corresponding device. Similar to the case given the peak-to-valley ratio, the difference between the measured powers $P_1$, and $P_2$, provides a statement concerning the current value of the measurable variable x. Apart from the simple mensuration principle, the optical insertion losses occurring in the transmission and reception station 1 are also very low; these, namely, are essentially only the losses in the brancher A, i.e., a total of approximately 3 dB for the forward and return path.

The asymmetrical quad-gate brancher illustrated in FIGS. 5 and 5A is preferably employed as the brancher A, exhibiting a thick fiber 30 for coupling to the fiber path 2, a ground fiber 40 for out-coupling of the light returning from the sensor 3 into the direction of the evaluation device and exhibiting two thinner in-coupling fibers 10 and 20, which are to be coupled to the light sources $S_1$, $S_2$. The ground, thick fiber 40 and the two thinner in-coupling fibers 10 and 20 are butt-joined to the unground thick fiber 30. One respective gate of the brancher is allocated to each of the said fibers. Instead of two in-coupling fibers, only a single in-coupling fiber as in the brancher A in FIG. 4, could be employed. More than two in-coupling fibers could also be provided.

Thick core fibers having, for example, a diameter of the fiber core of 200 $\mu$m are highly suitable for fiber-optical sensor systems, particularly because of the simple connection technique and because neither extremely high transmission lengths nor extremely high data rates occur. The core diameter of the ground thick core fiber 40 is therefore selected equal to the core diameter of the second thick fiber 30. The outside diameter of the two thick fibers 30 and 40 including the jackets 35 and 45 can, for example, amount to 230 $\mu$m. In accord with FIG. 5, the two thinner in-coupling fibers are attached such that an insertion loss of 0 dB theoretically derives for the light conducted in them and, at the same time, the coupling surface corresponding to the core-cross-section of the ground thick fiber 40 is still maximum. In-coupling fibers 10, 20 having core diameters of 30 through 40 $\mu$m and as thin as possible a jacket are well suited for constructing the brancher according to FIG. 5 because good input ratios at the side of the light sources still derive with them.

Thus, for example, it was stated in the Proc. Europ. Conf. Optical Commun., Copenhagen (1981), 8.1-1 through 8.1-7 that a change of the input efficiency factor for light from laser diodes is only slight for core diameters from 30 through 50 $\mu$m even given in-coupling into gradient fibers, whereas stepped profile fibers with a numerical aperture independent of the coupling point are taken into consideration here.

In measurements at three-gate, asymmetrical branches with thick fibers having a 200 $\mu$m core diameter and a 230 $\mu$m outside diameter and with thinner fibers having a 45 $\mu$m core diameter and 50 $\mu$m outside diameter, output losses of approximatey 2 dB derived from the unground thick fiber to the ground thick fiber. This value lies very close to the theoretically deriving losses for the input losses from a thinner fiber to a thick, unground fiber which are to be anticipated at approximately 1 dB loss.

Similar values are to be anticipated for a brancher according to FIG. 5 for these reasons.

Without or, respectively, with an additional narrow band filter, wavelength demultiplexer modules exhibit insertion losses of approximately 1.5 dB or, respectively, 3 dB per channel, whereby the cross-talk attenuation lies at approximately 15 dB or, respectively above 30 dB. Thus, losses which do not fall below 6 dB are to be anticipated per channel in the transmission and reception station for the forward and return path. This value lies clearly below the value which would be attainable with a traditional transmission and reception station.

The new module illustrated in FIGS. 6 and 6A–6C combines the function of the two coponents A and WDM of the transmission and reception device according to FIG. 1. It is a matter of five-gate frequency-selective brancher module, the technology described in Appl. Op. 20 (1981), pp. 3128–3135 again being expedient for its manufacture. A thick core stepped profile fiber coupled to the fiber path 2 is referenced 30' in FIG. 6. The dielectrical cut-off filter 50 serves for the combination or, respectively, for the spectral division of the light having the two wavelengths $\lambda_1$ and $\lambda_2$, said cut-off filter 50 being expediently directly vapor-deposited on the oblique end face of the fiber. The angle $\alpha$ between the axis of the out-coupling double fiber, 10 with 60, and the axis of the unground, thick fiber 30' amounts to 90° or less. The expedient selection depends on the channel spacing and on the required cross-talk attenution.

In detail given the brancher according to FIG. 6, two thick, aligning fibers 30' and 40' are separated by the frequency-selective filter layer 50 disposed obliquely relative to their axes. A branching thick fiber 60 is disposed such that light coupled out of the thick core fiber 30' and reflected at the filter layer 50 is coupled into the branching, thick fiber 60. The other thick fiber 40' and the branching, thick fiber 60 are laterally ground. Thinner in-coupling fibers 20' and 10' aligned axially parallel are applied to each of the laterally ground faces 41' or, respectively, 61, of these two, ground thick fibers 40' and 60 which face the filter layer 50, being applied such that light can transfer over between each of the in-coupling fibers and the unground, thick fiber 30' through the filter layer 50 or due to reflection thereat. A respective gate of the brancher is allocated to each of the said fibers, i.e., five gates are provided.

The brancher according to FIG. 6 is disposed in the transmission and reception device according to FIG. 1 such that the fiber path 2 is connected to the unground, thick fiber 30', the detectors $D_1$ and $D_2$ are connected to the ground, thick fibers 40' and 60, and the thinner fibers 10' and 20' are connected to the light sources $S_1$ and $S_2$. The thicker fibers 30', 40' and 60, for example, exhibit a core diameter of 200 $\mu$m, whereas the thinner fibers 10' and 20' again exhibit a core diameter of approximately 30 through 50 $\mu$m.

Given the module according to FIG. 5, overall losses per channel for the forward and return path of approximately 4.5 dB are to be anticipated in the transmission and reception device according to FIG. 1. Approximately 6 dB are to be anticipated with additional narrow band filters such as $SF_1$ and $SF_2$. In addition to the minimal losses in the transmission and reception device, the extremely compact structure of the optical part is to be emphasized given employment of the module according to FIG. 6.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A transmission and reception device for a fiber-optic sensor system functioning with two wavelengths, comprising a transmitter emitting a first wavelength and a transmitter emitting a second wavelength, whereby each wavelength is supplied to a transmitter-side end of a fiber path of the sensor system for in-coupling, and comprising an evaluation means for measuring the power of a radiation having the first wavelength supplied from the transmitter-side end of the fiber path to the evaluation means and for measuring the power of a radiation having the second wavelength supplied to the evaluation means from the same end of the fiber path, characterized in that said transmission and reception device includes a fiber-optical light waveguide brancher which includes one gate at the side of said fiber path to which said fiber path is coupled and which includes one respective gate per transmitter at the side facing away from said fiber path to which an allocated transmitter is coupled, and also includes a gate allocated to said evaluation means to which said evaluation means is coupled, the fiber-optical brancher further comprising two butt-coupled fibers of a first thickness of which one is laterally ground; and by one or more relatively thinner fibers applied to the laterally ground face of the one thicker fiber, said thinner fibers being likewise butt-coupled to the unground thicker fiber, whereby a respective gate of the brancher is allocated to each of said fibers.

2. The device according to claim 1, wherein said evaluation device includes two separate detectors of which one is sensitive to said first wavelength and the other is sensitive to the second wavelength; and in that a light waveguide wavelength demultiplexer is disposed between the gate of the brancher allocated to said evaluation means and said detectors.

3. The device according to claim 2, wherein a narrow band filter is disposed between the wavelength demultiplexer and a detector, said narrow band filter essentially allowing only that wavelength to pass for which the appertaining detector is sensitive.

4. The device according to claim 2, wherein said brancher and said wavelength demultiplexer is a single, five-gate, wavelength-selective light waveguide brancher.

5. The device according to claim 1, wherein said evaluation means includes two diodes monolithically integrated above one another in a single semiconductor module, of which the upper diode coupled to the gate of said brancher allocated to said evaluation means is only sensitive to one of said two wavelengths and is transparent for the other wavelength.

6. The device according to claim 5, wherein said upper diode is transparent for the shorter of said two wavelengths.

7. The device according to claim 1, wherein said evaluation means consists of a spectrometer.

8. The device according to claim 1, wherein said evaluation means consists of a means analyzing the chronological progression of the supplied signals, which is connected to the gate of the fiber-optical brancher allocated to said evaluation means.

9. The device according to claim 7, wherein a single transmitter which emits both wavelengths is employed for generating the radiation having said first wavelength and the radiation having said second wavelength.

10. The device according to claim 9, wherein said single transmitter consists of a light-emitting diode having a large emission half-value width.

11. A brancher having a plurality of gates comprising two butt-coupled fibers of a first thickness of which one is laterally ground; and by one or more relatively thinner fibers applied to the laterally ground face of the one relatively thicker fiber, said thinner fibers being likewise butt-coupled to the unground thicker fiber, whereby a respective gate of the brancher is allocated to each of said fibers.

12. A transmission and reception device for a fiber-optic sensor system functioning with two wavelengths, comprising a transmitter emitting a first wavelength and a transmitter emitting a second wavelength, whereby each wavelength is supplied to a transmitter-side end of a fiber path of the sensor system for in-coupling, and comprising an evaluation means for measuring the power of a radiation having the first wavelength supplied from the transmitter-side end of the fiber path to the evaluation means and for measuring the power of a radiation having the second wavelength supplied to the evaluation means from the same end of the fiber path, characterized in that said transmission and reception device includes a fiber-optical light waveguide brancher which includes one gate at the side of said fiber path to which said fiber path is coupled and which includes one respective gate per transmitter at the side facing away from said fiber path to which an allocated transmitter is coupled, and which also includes a gate allocated to said evaluation means to which said evaluation means is coupled, wherein said waveguide brancher further comprises two butt-coupled fibers of a first thickness of which one is laterally ground; and by one or more relatively thinner fibers applied to the laterally ground face of the one thicker fiber, said thinner fibers being likewise butt-coupled to the unground thicker fiber, wherein said fiber path is coupled to the unground, thicker fiber, a transmitter is coupled to each thinner fiber, and said evaluation means is coupled to said ground, thicker fiber.

13. A five-gate, wavelength-selective brancher, comprising a fiber-optic brancher wherein two aligning fibers of a first thickness are separated by a frequency-selective filter layer disposed obliquely relative to their axes; wherein a branching fiber of a similar thickness is disposed such that a radiation coupled out of one of the two aligning fibers and reflected at the filter layer is coupled into the branching fiber wherein the other of the two aligning fibers and the branching fiber are laterally ground; and in that relatively thinner fibers aligned axially parallel are attached to each of the two laterally ground faces of the two ground, thicker fibers facing the filter layer being applied such that radiation can transfer over between each of said thinner fibers and the one unground, thicker fiber through the filter layer or due to reflection thereat, whereby a respective gate of the brancher is allocated to each of said fibers.

14. A transmission and reception device for a fiber-optic sensor system functioning with two wavelengths, comprising a transmitter emitting a first wavelength and a transmitter emitting a second wavelength, whereby each wavelength is supplied to a transmitter-side end of a fiber path of the sensor system for in-coupling, and comprising an evaluation means for measuring the power of a radiation having the first wavelength supplied from the transmitter-side end of the fiber path to the evaluation means and for measuring the power of a radiation having the second wavelength supplied to the evaluation means from the same end of the fiber path, characterized in that said transmission and reception device includes a fiber-optical light waveguide brancher which includes one gate at the side of said fiber path to which said fiber path is coupled and which includes one respective gate per transmitter at the side facing away from said fiber path to which an allocated transmitter is coupled, and which also includes a gate allocated to said evaluation means to which said evaluation means is coupled, said evaluation device including two separate detectors of which one is sensitive to said first wavelength then the other is sensitive to the second wavelength, and in that a light waveguide wavelength demultiplexer is disposed between the gate of the brancher allocated to said evaluation means and said detectors, said brancher and said wavelength demultiplexer being a single, five-gate, wavelength-selective waveguide brancher, said single five-gate, wavelengthselective brancher comprising a fiber optic brancher wherein two aligning fibers of a first thickness are separated by a frequency-selective filter layer disposed obliquely relative to their axes; wherein a branching fiber of a similar thickness is disposed such that a radiation coupled out of one of the two aligning fibers and reflected at the filter layer is coupled into the branching fiber; wherein the other of the two aligning fibers and the branching fiber are laterally ground; and in that relatively thinner fibers aligned axially parallel are attached to each of the two laterally ground faces of these two ground, thicker fibers facing the filter layer, being applied such that radiation can transfer over between each of said thinner fibers and the one unground, thicker fiber through the filter layer or due to reflection thereat, whereby a respective gate of the brancher is allocated to each of said fibers.

15. A brancher according to claim 14, characterized in that said fiber path is connected to said unground, thicker fiber; said detectors are connected to said ground, thicker fibers; and said transmitters are connected to said thinner fibers.

16. The brancher according to claim 11 wherein said thicker fiber consists of a thick core fiber having a core diameter in the range of 150 $\mu$m through 250 $\mu$m and said thinner fiber consists of a core-jacket fiber having a diameter in the range of 20 $\mu$m through 60 $\mu$m.

17. The brancher according to claim 13 wherein said thicker fiber consists of a thick core fiber having a core diameter in the range of 150 $\mu$m through 250 $\mu$m and said thinner fiber consists of a core-jacket fiber having a diameter in the range of 20 $\mu$m through 60 $\mu$m.

18. A brancher according to claim 11, characterized in that the ground, planar face of said thicker fiber is parallel to the axis of said fiber.

19. A brancher according to claim 13, characterized in that the ground, planar face of said thicker fiber is parallel to the axis of said fiber.

* * * * *